United States Patent [19]

Clement

[11] 4,234,275
[45] Nov. 18, 1980

[54] METHOD AND APPARATUS FOR MOUNTING AN ENGINE BLOCK BORING MACHINE

[76] Inventor: Michael H. Clement, 4797 Myrtle Dr., Concord, Calif. 94521

[21] Appl. No.: 928,268

[22] Filed: Jul. 26, 1978

[51] Int. Cl.³ ............................................ B23B 41/12
[52] U.S. Cl. .................................... 408/19; 51/241 S; 51/290; 248/646; 248/651; 408/111; 408/709; 409/175; 409/189
[58] Field of Search .................... 408/1, 19, 56, 92, 95, 408/111, 138, 709; 409/219, 175, 185, 189; 51/241 S, 290; 248/646, 651, 660, 661, 669

[56] References Cited

U.S. PATENT DOCUMENTS

| | | | |
|---|---|---|---|
| 1,986,006 | 1/1935 | McClellan et al. | 409/219 |
| 2,006,159 | 6/1935 | Connor | 51/290 X |
| 2,604,284 | 7/1952 | Arp | 248/651 |
| 3,273,423 | 9/1966 | Rottler | 408/709 X |
| 4,117,633 | 10/1978 | Yother | 51/262 R |

Primary Examiner—Z. R. Bilinsky
Attorney, Agent, or Firm—Fitch, Even, Tabin, Flannery & Welsh

[57] ABSTRACT

A method and apparatus for positioning a boring machine relative to an engine block or the like has a base plate suitable for arrangement upon a deck surface of the block, the plate being formed with openings above each of the cylindrical bores as well as in alignment with threaded passages in the block. Preferably, bolts are threaded into the block to secure the base plate so that, during reboring, the bolts distort the block about the bores in a similar manner as during engine operation. Also preferably, adjustable means are arranged between the base plate and the deck surface of the engine block in order to position the base plate in precise alignment with the main bearing axis of the engine block so that the bores are formed perpendicularly to the main bearing axis.

2 Claims, 3 Drawing Figures ical bore may be very precisely sized by use of a honing machine or the like. In any event, the construction and/or reconditioning of engine blocks requires close tolerance sizing of the piston cylinders. At the same, it is particularly important that the bores be formed in precise alignment within the engine block to insure proper operation of the engine over extended periods of time.

METHOD AND APPARATUS FOR MOUNTING AN ENGINE BLOCK BORING MACHINE

The present invention relates to a method and apparatus for mounting a boring machine upon an engine block or the like in order to rebore cylinder bores and the like in the block, and more particularly to such a method and apparatus wherein the boring operation is made simpler and more precise and also wherein the bores are formed with the engine block being under similar distortion as it experiences during operation.

Portable boring machines, commonly referred to as "boring bars," are employed to bore or rebore the cylinders of engine blocks. Accordingly, although the invention is described below with particular reference to a method and apparatus for boring or reboring cylinder bores in an engine block, it will be apparent that the method and apparatus may also be adapted for other applications in engine blocks and the like.

In practice, the boring machines are formed as elongated assemblies including a boring head which is axially movable during the boring operations. Commonly, the boring machine is employed to form a bore having a diameter which is undersized by at lease 0.001–0.002 inches. Thereafter, the cylindrical bore may be very precisely sized by use of a honing machine or the like. In any event, the construction and/or reconditioning of engine blocks requires close tolerance sizing of the piston cylinders. At the same, it is particularly important that the bores be formed in precise alignment within the engine block to insure proper operation of the engine over extended periods of time.

Within the prior art, it has been known to employ various types of boring fixtures for mounting boring machines upon engine blocks during boring of cylinder bores and the like. Most commonly, the boring machine has been mounted upon a base structure which is clamped in place upon the engine block. With the supporting structure clamped to the engine block, the boring machine may be shifted into alignment with one or more bores in the engine in order to separately bore each one. However, a number of disadvantages have been observed in such operations. Initially it is generally necessary to unclamp the boring fixture from the engine block and reclamp it in order to permit boring of an entire set of cylinder bores in the block. For example, it is common to clamp the boring fixture to one end of the block while positioning the boring machine to form bores in the other end of the block. Thereafter, the boring fixture must be reclamped on the other end of the engine block in order to permit access of the boring machine to those bores originally covered by the clamping device.

In addition, it is important to simplify and facilitate such boring operations while assuring precise alignment of the bores within the engine block. It is also important to form a bore within the engine block which remains "true" during operation of the engine in order to insure proper sealing between the cylinder walls and the pistons, for example.

SUMMARY OF THE INVENTION

Accordingly, it is an object of the invention to provide a fixture for aligning a boring machine with a workpiece within which a bore is to be formed. The invention particularly contemplates forming or reforming various bores in an engine block or the like facilitating the boring operation and assuring that the bore is very accurately aligned and formed within the workpiece or engine block.

It is a more particular object of the invention to provide a fixture for mounting a boring machine in place upon an engine block in order to bore or rebore cylinder bores in the engine block, the fixture including a plate secured to the engine block by bolts which tend to distort and/or stress the engine block in a similar manner as experienced by the block during engine operation.

It is another particular object of the invention to provide a method and apparatus for assuring that cylinder bores in an engine block are formed in perpendicular alignment with a main bearing axis, this object being accomplished by arranging a fixture plate upon the engine block in a predetermined alignment relative to the main bearing axis and supporting a boring machine thereupon in order to form the cylinder bores.

Additional objects and advantages of the invention are made apparent in the following description having reference to the accompanying drawings.

DESCRIPTION OF THE PREFERRED EMBODIMENT

Figure 1:
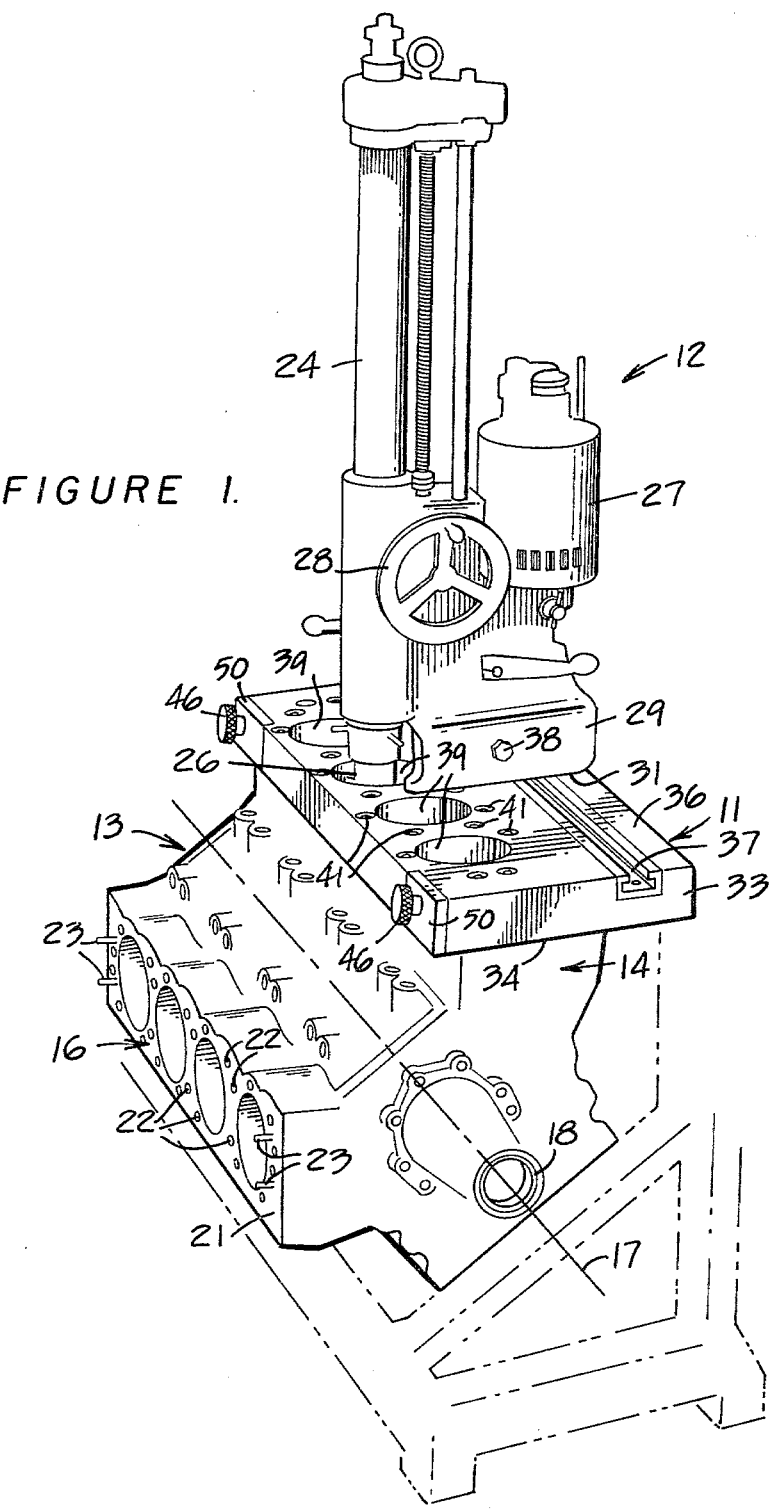
FIG. 1 is a perspective view of a boring machine supported in place upon an engine block by a boring fixture comprising a base plate in accordance with the present invention.

Referring now to the drawings and particularly to FIG. 1, the present invention contemplates a boring fixture 11 for positioning or mounting a boring machine 12 relative to an engine block or work piece 13 within which a cylindrical bore is to be formed by the boring machine.

Within this combination, the boring machine 12 is of generally conventional configuration and is described only briefly below in order to more clearly indicate the manner of cooperation between the boring fixture of the present invention and the boring machine. Similarly, the work piece 13 is preferably illustrated within FIG. 1 as a V-type engine block having two banks of four cylinders arranged perpendicularly to a common main bearing axis. However, it will be apparent from the following description that the fixture may be adapted for use with any of a variety of engine blocks and accordingly is not limited to use in combination with the V-type block as illustrated in FIG. 1.

It will also be apparent that the fixture may be employed for forming other cylindrical bores in the engine block and other applications. The fixture may also be used either during manufacture of the engine block when the bores are initially formed or to reform or reshape the bores as is common when the engine is reconditioned. Furthermore, the fixture may be employed for mounting or positioning the boring machine in place relative to other work pieces wherein precisely aligned and shaped bores are to be formed.

Before describing the fixture 11 in greater detail, various features of the boring machine 12 and engine block 13 are described in order to more clearly indicate the manner in which those components cooperate with the fixture.

The engine block 13 includes two banks 14 and 16 of cylinder bores, both of which are arranged perpendicular to the axis or center line 17 of a plurality of main bearings 18 arranged in a lower or central portion of the engine block. Each bank of cylinder bores extends upwardly and intersects a deck or flat surface indicated respectively at 19 and 21. A plurality of threaded passages 22 is formed upon each of the decks 19 and 21 about the cylinder bores and aligning bolts 23 extend upwardly from each of the decks 19 and 21. The aligning dowels or pins 23 serve to assure proper alignment of a conventional head (not shown) upon each deck of the engine block. The head is formed with passages which align with the threaded passages 22 in the deck of the engine block. With the head positioned in place upon the engine block deck by the aligning bolts 23, additional bolts are passed through the head and secured in the threaded passages 22 under a predetermined torque force in order to secure the head in place upon the engine block.

The engine is of course operated in this configuration with pistons being arranged in the respective piston bores and interconnected with a crankshaft (not shown) supported by the main bearings 18. In order to assure proper operation of the engine, it is desirable that each of the cylinder bores be formed in precise perpendicular alignment with the axis of the main bearings 18 which support the crankshaft. At the same time, it is also desirable that each cylindrical bore exhibit an accurate or true cylindrical dimension along its length during engine operation to assure proper sealing engagement between the cylinder bore and sealing rings (not shown) on the pistons. Certain components described above such as the pistons, head assemblies and crankshaft are of completely conventional construction and are omitted from the drawings in order to more clearly illustrate the combination of the present invention.

The boring machine 12 is also of generally conventional configuration and includes an elongated axially movable unit 24 for raising and lowering a rotatable cutting head 26 through each bore to be formed in the engine block or work piece. The boring machine also includes motor means 27 for driving the cutting head in rotation as well as means, indicated at 28, for regulating axial movement of the cutting head by the unit 24. The boring machine 12 includes a base frame 29 having a flat bottom surface 31 with a T-shaped bar 32 arranged upon the surface 31. The function of the flat surface 31 and T-shaped slat 37 is discussed in greater detail below in connection with the boring fixture of the present invention.

Generally, the boring fixture 11 comprises a base plate 33 which is adapted for mounting upon a flat surface such as one of the decks 19 or 21 of the engine block 13. The base plate 33 is also adapted to mount or support the boring machine so that it is positioned in fixed alignment relative to the engine block. The manner in which the base plate 33 accomplishes these functions is described in greater detail below.

Figure 2:
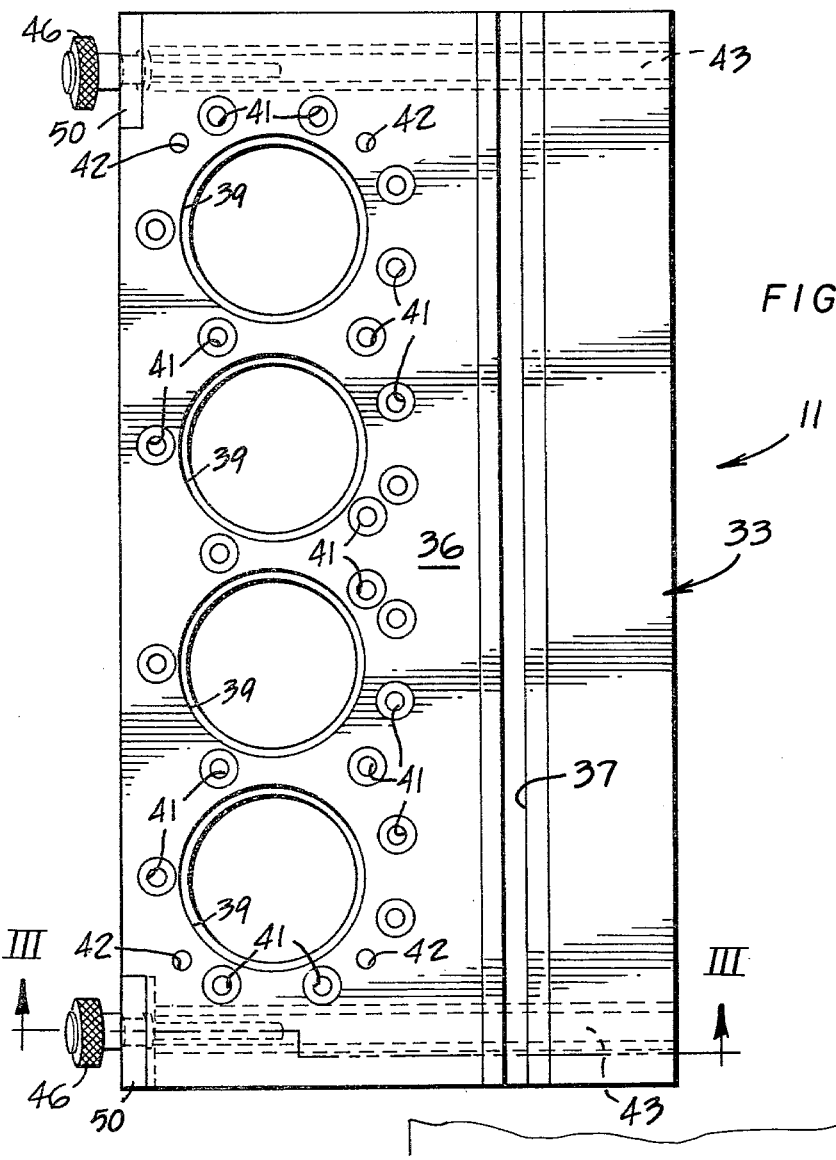
FIG. 2 is a plan view of the base plate also illustrated in FIG. 1.
Figure 3:
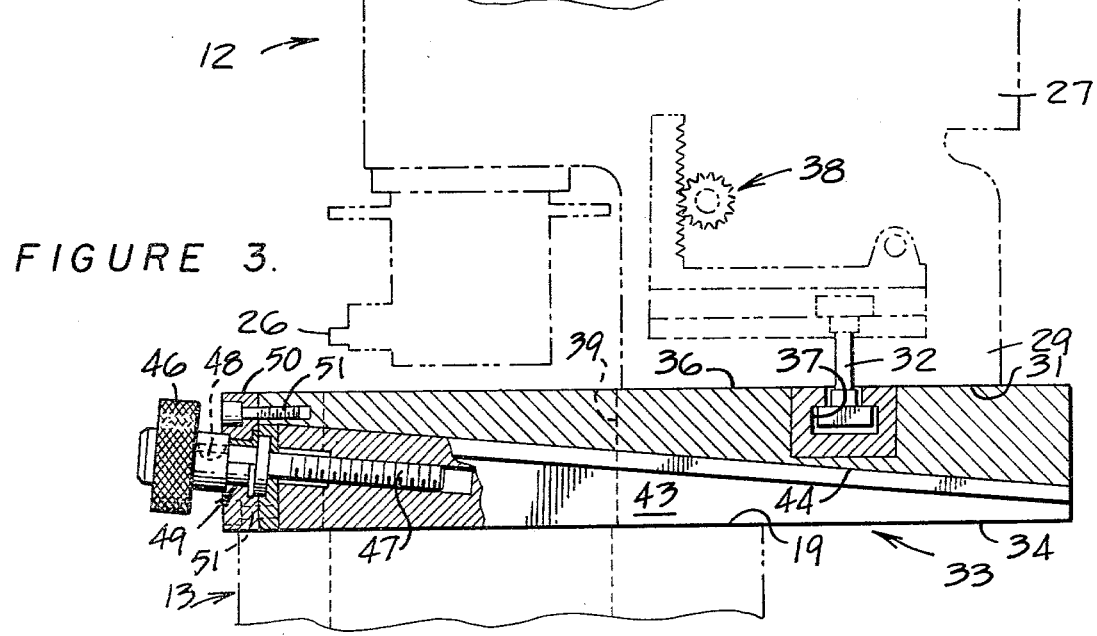
FIG. 3 is a view taken along section line III—III in FIG. 2.

Referring also to FIGS. 2 and 3, the base plate 33 is preferably formed from metal and has substantial thickness, for example, two to three inches, in order to maintain dimensional accuracy. The plate 33 has a flat lower surface 34 parallel to the top surface adapted for resting upon one of the decks, for example that indicated at 19, on the engine block 13. The base plate 33 also has an upper surface 36 in which is formed a T-shaped slot 37 for receiving the T-shaped bar 32 on the boring machine. With the T-shaped bar being slidably arranged in the slot 37, clamping means indicated at 38 serve to fix the position of the boring machine along the slot 37. The slot 37 is formed in a removable insert 37A, preferably held in place by capscrews (not shown), in order to facilitate replacement of the insert when the slot 37 loses its shape due to continued use or the like.

Referring particularly to FIG. 2, the base plate 33 is formed with a plurality of openings 39 which are slightly larger than and aligned respectively with the bank of cylinder bores indicated for example at 14. The base plate is also formed with a plurality of passages 41 which register with the threaded passages 22 in the engine block. In addition, the base plate has alignment openings 42 for receiving the alignment bolts on the engine block.

With the base plate being arranged in place upon one deck of the engine block, bolts are positioned through the passages 41 and threaded into the engine block. The bolts are preferably torqued to the same level employed for securing the head in place upon the engine block. This is a particularly important feature of the invention since with bolts arranged in each of the threaded passages 22 and torqued in the manner described above, the engine block is distorted or stressed by the bolts identically as during the engine operation. This feature of the invention prevents relative distortion of the cylinder bores after they are formed by the boring machine and thereafter honed. By contrast, in the prior art, the threaded passages 22 have not been filled during either boring or honing operations. Accordingly, any stress or distortion caused by insertion of bolts into these threaded passages when the head is arranged in place upon the engine block produces a different condition than that existing during the boring and honing operations. Thus, within the prior art, even though a perfectly true or round cylindrical bore is formed in the block, relative distortion may be produced by the bolts employed in the threaded passages to secure the head in place. This possibility is eliminated by the present invention since, as noted above, the engine block surrounding the cylinder bore is under similar distortion or stress during both engine operation and during boring and/or honing operations.

In operation, the T-shaped bar of the boring machine is arranged within the slot 37 and positioned relative to a selected cylinder bore by the clamping means 38 (see FIGS. 2 and 3). The elongated unit 24 is then operated to raise and lower the rotatable cutting head 26 through the respective cylinder bore. After each of the cylinder bores has been formed by the boring machine, the base plate 33 is preferably left in place upon the deck of the engine block during honing of the bores so that the cylindrical bore formed by the honing operation will remain "true" when the head is torqued in place upon the engine block and pistons are arranged within the cylinder bores for engine operation.

In addition, the invention contemplates means for assuring that each of the cylinder bores is formed in precisely perpendicular relation to the center line of the main bearings. For this reason, a movable or adjustable wedge element 43 is arranged within a wedge shaped cavity 44 under either end of the base plate 33. An adjusting knob 46 is secured to a shaft 47 which is threaded into the wedge shaped element. The knob 46 is secured to the shaft 47 by a key 48 and supported by a bushing 49 mounted in a bracket 50 secured to the base plate by capscrews 51. Accordingly, the adjusting knob 46 is rotated to shift the wedge shaped element 42 and raise or lower the respective end of the base plate 33 upon the deck surface 19 of the engine block (see FIG. 3). With the base plate arranged in place upon one of the deck surfaces of the engine block, micrometer means may be employed to measure the distance of each end of the base plate from the main bearing center line. By adjustment of one or both of the wedge shaped elements, the base plate 33 is placed in precise parallel alignment with the center line of the main bearings.

With the base plate positioned parallel to the center line of the main bearings, the boring machine is also positioned relative to the axis of the main bearings by the base plate so that the cylinder bores are formed in precisely perpendicular alignment to the main bearing axis. This of course serves to eliminate or minimize stress produced by intersection between pistons arranged in the respective cylinder bores and a crankshaft supported by the main bearings.

From the preceding description, it will be apparent that the base is not in abutting engagement with the deck 19 when one end of the base plate is raised by one of the wedge members described above. Accordingly, at such times, it is not desirable to use torqued bolts along the plate since it would be susceptible to warping. However, this feature of the invention may also be employed to assure the formation of accurate or true cylinders in the block. Preferably, the base plate is secured to the engine block by bolts adjacent the wedge members in order to prevent the base plate from being bowed during the boring operation. Once the boring operation is completed, the wedge members may be removed in order to assure that the base plate is solidly supported upon the deck of the engine block. Thereafter, the base plate may be secured by bolts which are torqued in the same manner as described above. The cylinder bores may then be honed in order to accurately size the bores while they are stressed in the same manner experienced during engine operation. Accordingly, an accurate or true cylinder may be formed during honing which will also be present when the engine is reassembled for operation.

Accordingly, there are been described above a fixture for securing a boring machine in place upon an engine block or work piece to form cylindrical bores of accurate position and shape. Various modifications are believed apparent from the preceding description. Initially, the fixture of the present invention may also be employed for positioning the boring machine upon a variety of different engine blocks besides the specific block illustrated in FIG. 1. However, the openings 39 and passages 41 formed upon the base plate would of course have to be formed for alignment with the respective cylinder bores and threaded passages in any particular engine head. In addition as was noted above, the fixture 11 and boring machine 12 could also be adapted for boring or reboring other parts of an engine block as mentioned above.

Additional modifications and variations are clearly apparent from the preceding description. Accordingly, the scope of the present invention is defined only by the following appended claims.

I claim:

1. A boring fixture for positioning a boring machine in place upon an engine block having a main bearing axis and a plurality of cylindrical bores arranged perpendicular to the main bearing axis and intersecting a generally flat deck of the block, comprising a base plate adapted to mount upon the deck of the block, said base plate having openings formed in alignment with the cylinder bores and means for securing the boring machine in place upon said base plate in alignment with the cylindrical bores, said means for securing the boring machine comprising a T-shaped slot formed in the base plate for receiving a T-shaped bar on the boring machine and clamping means for fixing the position of the boring machine upon the base plate, adjustable means arranged for interaction between said base plate and the deck of the engine block in order to selectively adjust the position of said base plate upon the deck and thereby place said base plate in precise parallel alignment with the main bearing axis, said adjustable means comprising a slidable wedge-shaped element arranged in a wedge-shaped cavity formed in each end of said base plate with means for adjusting said wedge-shaped elements between said wedge-shaped cavities and a surface portion of the engine block to permit alignment of said base plate with respect to the main bearing axis to perform a boring operation, and means for selectively securing said base plate upon the deck of the engine block, said means for securing said base plate upon the deck of the engine block comprising bolts for engaging threaded openings in the block in order to produce distortion of the block about the bores similar to distortion conditions experienced in the block during engine operation, the base plate also being engagable with the engine block by means of said distortion producing bolts to permit accurate finishing of the cylindrical bores.

2. The fixture of claim 1 wherein said base plate is of substantial thickness in order to resist distortion, said T-shaped slot being formed by an insert secured in place upon said base plate in order to permit its replacement when necessary, sad wedge-shaped cavities being formed by said base plate and said wedge-shaped elements arranged therein extending substantially across said base plate in order to better establish the position of said base plate upon the engine block.

* * * * *